US008849854B2

(12) United States Patent
Kakarla et al.

(10) Patent No.: US 8,849,854 B2
(45) Date of Patent: Sep. 30, 2014

(54) METHOD AND SYSTEM FOR PROVIDING DETAILED INFORMATION IN AN INTERACTIVE MANNER IN A SHORT MESSAGE SERVICE (SMS) ENVIRONMENT

(75) Inventors: Kashinath Kakarla, Bangalore (IN); Vishnu Nanda, Bangalore (IN); Anup P. Mutalik, Bangalore (IN); Sagar Dutta, Bangalore (IN)

(73) Assignee: Intuit Inc., Mountain View, CA (US)

( * ) Notice: Subject to any disclaimer, the term of this patent is extended or adjusted under 35 U.S.C. 154(b) by 312 days.

(21) Appl. No.: 13/014,862

(22) Filed: Jan. 27, 2011

(65) Prior Publication Data

US 2012/0197937 A1  Aug. 2, 2012

(51) Int. Cl.
*G06F 7/00* (2006.01)
*G06F 17/30* (2006.01)

(52) U.S. Cl.
CPC .... *G06F 17/30395* (2013.01); *G06F 17/30734* (2013.01)
USPC ............................ 707/772; 707/792; 709/206

(58) Field of Classification Search
CPC .................... G06F 17/30734; G06F 17/30861; G06F 17/30908; G06F 17/30017; G06F 17/30554; G06F 17/30103; G06F 7/00; G06F 15/16; H04L 12/581; H04L 51/04; C06Q 10/10; H04Q 7/20; G06Q 10/109
See application file for complete search history.

(56) References Cited

U.S. PATENT DOCUMENTS

| | | | |
|---|---|---|---|
| 5,392,428 A * | 2/1995 | Robins ................................. 1/1 |
| 7,477,909 B2 * | 1/2009 | Roth .............................. 455/466 |
| 7,707,218 B2 * | 4/2010 | Gocht et al. ................... 707/758 |
| 2005/0228797 A1 | 10/2005 | Koningstein et al. |
| 2006/0040684 A1 * | 2/2006 | Ala-Luukko ................. 455/466 |
| 2006/0047572 A1 * | 3/2006 | Moore et al. ..................... 705/14 |
| 2007/0026879 A1 * | 2/2007 | Ala-Luukko ................. 455/466 |
| 2007/0099636 A1 * | 5/2007 | Roth .............................. 455/466 |
| 2007/0155306 A1 * | 7/2007 | Koli et al. ..................... 455/3.01 |
| 2007/0186241 A1 * | 8/2007 | Sugimoto et al. ............... 725/46 |
| 2007/0294725 A1 * | 12/2007 | Cohen et al. ..................... 725/37 |
| 2008/0001717 A1 * | 1/2008 | Fiatal ........................... 340/10.3 |
| 2008/0148175 A1 * | 6/2008 | Naaman et al. ............... 715/781 |
| 2009/0111489 A1 * | 4/2009 | Wilson .......................... 455/466 |
| 2010/0230176 A1 * | 9/2010 | Smith .......................... 175/426 |
| 2010/0312572 A1 | 12/2010 | Ramer et al. |
| 2010/0318551 A1 | 12/2010 | Lai |
| 2011/0238409 A1 * | 9/2011 | Larcheveque et al. ............ 704/9 |

OTHER PUBLICATIONS

Kakarla et al., "Method and System for Providing an SMS-Based Interactive Electronic Marketing Offer Search and Distribution System," U.S. Appl. No. 13/007,247, filed Jan. 14, 2011.

* cited by examiner

*Primary Examiner* — Daniel Kuddus
(74) *Attorney, Agent, or Firm* — Hawley Troxell Ennis & Hawley LLP; Philip McKay

(57) ABSTRACT

A method and system for providing a SMS-based interactive information search and distribution system whereby a series of linked, refined, and evolving root topic and root topic related information searches are performed in association with a thread of SMS text messages and automated SMS text message responses including search parameters and highlighted keywords to provide the user with a fully interactive information search and distribution system using a SMS communication channel, and within the constraints of the SMS protocols.

20 Claims, 2 Drawing Sheets

METHOD AND SYSTEM FOR PROVIDING DETAILED INFORMATION IN AN INTERACTIVE MANNER IN A SHORT MESSAGE SERVICE (SMS) ENVIRONMENT

BACKGROUND

The information age, the Internet, and the resulting improved information sharing capabilities, has radically changed many aspects of life and business in many parts of the world. However, in some emerging economies users still have considerable difficulty obtaining desired information via communications networks such as the Internet.

Currently, this problem is largely attributable to a lack of network infrastructure and the very limited availability of internet access, particularly in more rural areas. In short, for many consumers/users in regions with emerging economies, Personal Computers (PCs) and Internet access is very limited.

However, in contrast to traditional Internet access, mobile phones, smart phones, and other forms of cellular, or telephone technology, have a great reach and are widely available and generally affordable. Consequently, mobile phones are often readily available to a much larger set of users than traditional PCs and the Internet and have the potential, at least in theory, to provide users access to information they desire. However, this potential is currently very limited, if not out and out blocked, by the fact that mobile phone technology uses Short Message Service (SMS).

SMS is the text communication service component of phone, web, or mobile communication systems. SMS uses relatively rigid standardized communications protocols that allow the exchange of only very short text messages between fixed line or mobile phone devices. Currently, SMS text messaging is the most widely used data application in the world, with 2.4 billion active users, or 74% of all mobile phone subscribers. However, due to the current limits on the size of messages, and the very simple/light weight user interfaces associated with mobile phones and SMS, as currently implemented, SMS does not readily, easily, of efficiently, lend itself to the exchange of detailed information, or interactive searches for information and/or data.

In light of the situation described above, even though, in terms of access and availability, SMS is the best communication channel for many parts of the world, the severe limitations of SMS communication channels has prevented SMS from being an effective means of exchanging detailed information, or providing an interactive information search capability. As a result, currently, many users in areas with emerging economies are denied the full benefits of the information age and the ability to obtain information interactively and efficiently.

SUMMARY

In accordance with one embodiment, a method and system for providing a SMS-based interactive information search and distribution system includes a process for providing a SMS-based interactive information search and distribution system whereby, in one embodiment, source topic data representing information related to, and/or associated with, one or more root topics is obtained. In one embodiment, key features, and/or potential "keywords", associated with the source topic data are identified and associated with the respective source topic data. In one embodiment, a user sends initial search parameter data in the form of SMS text in an "original SMS text message". In one embodiment, the "original SMS text message" includes an initial search parameter that indicates a root topic of interest, i.e., a root topic about which the user desires some information, and for which the user would like to conduct a search. In one embodiment, the "original SMS text message" also includes one or more other initial search parameters associated with the root topic of interest, and/or the user, such as a further refinement of the root topic of interest, or a location of the user. In one embodiment, the initial search parameter data from the "original SMS text message" is used to search the source topic data representing information related to, and/or associated with, one or more root topics. In one embodiment, a "SMS search response text message" is automatically generated and sent back to the user that includes SMS text representing a defined number of the "top" "matched root topics", i.e., root topics matching, or most closely matching, the initial search parameters. In one embodiment, one or more keywords in the SMS text in the "SMS search response text message" representing the "matched" root topics are bracketed, or otherwise highlighted, to indicate that more root topic related information is available regarding the keywords. In one embodiment, if the user desires more information regarding the keywords, the user need only send a "follow-up SMS text message" back that includes the keyword, or an indicated phrase including the keyword. In one embodiment, the keywords are flexible and inferred within the context of the "original SMS text message" and the initial search parameters. In one embodiment, if the user sends a "follow-up SMS text message" that includes the keyword, or an indicated phrase including the keyword, the source topic data representing information related to, and/or associated with, one or more root topics is again searched for "keyword matched root topic" related information not only matching the keyword but also matching, or consistent with the context of, the initial search parameters of the "original SMS text message" from the user, and/or the "matched root topics". Consequently, using the "follow-up SMS text message", or subsequently "follow-up SMS messages", the user can select the highlighted keyword, and/or keyword phrase response, to define, and automatically request, a further refined search and, in one embodiment, these further refined searches are made using the added search parameters, in the form of the identified keywords, as interpreted within the context of all the initial parameters, and all keywords identified thus far. Consequently, in one embodiment, a series, or tree, of linked, refined, and evolving root topic and root topic related information searches are performed in association with a thread of SMS text messages to provide the user with a fully interactive information search and distribution system using a SMS communication channel, and within the constraints of the SMS protocols.

Using the method and system for providing a SMS-based interactive information search and distribution system, as discussed herein, the keywords are flexibly and dynamically defined, inferred, selected, and interpreted, by the content, and within the context, of the set of SMS text messages sent and the root topic and root topic related information itself. Consequently, the SMS-based interactive information search and distribution systems provided using the method and system for providing a SMS-based interactive information search and distribution system, as discussed herein, are user friendly and their use/operation is intuitive for the user.

In addition, as discussed above, using the method and system for providing a SMS-based interactive information search and distribution system, a thread of root topic and root topic related information searches associated with a thread of SMS text messages is created to provide the user with a fully interactive information search and distribution system using a SMS communication channel, and within the constraints of the SMS protocols. Consequently, the severe limitations of SMS communication channels that had historically prevented SMS channels from being used as an interactive information search and distribution means are overcome. Therefore, using the method and system for providing a SMS-based interactive information search and distribution system, as discussed herein, many users/consumer in areas of the world having emerging economies can be provided more of the benefits of the information age and the benefits of interactive information searches.

Figure 1:
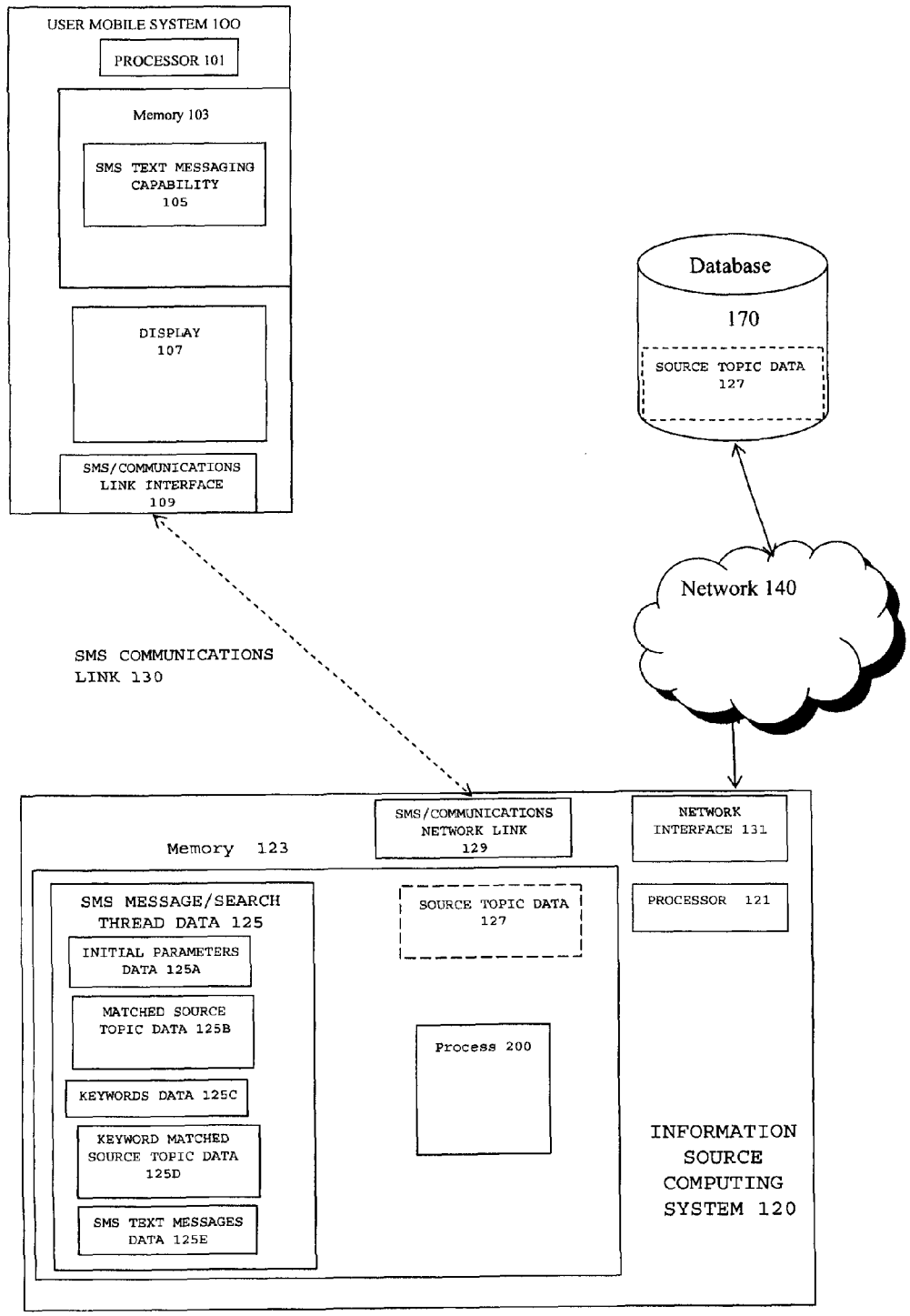
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms other than those shown and discussed herein and should not be construed as limited to the embodiments set forth herein, shown in the FIG.s, and/or described below.

In accordance with one embodiment, a method and system for providing a SMS-based interactive information search and distribution system includes a process for providing a SMS-based interactive information search and distribution system whereby data representing information related to, and/or associated with, one or more root topics is obtained.

In one embodiment, the source topic data is obtained by an information source computing system, such as a backend server system. In one embodiment, the source topic data is obtained by the information source computing system from one or sources of information data via a network, such as the Internet or in the form of a computer program product. In one embodiment, the source topic data is obtained by the information source computing system in the form of Extensible Markup Language (XML) via a network, such as the Internet.

In one embodiment, one or more processors associated with the information source computing system identify parameters or "key features" associated with the source topic data. In various embodiments, the key features can include, but are not limited to, any one or more of the following: one or more root topics; the general and/or specific sub-topics associated with the one or more root topics; names associated with the one or more root topics; other root topics related to, and/or associated with, the one or more root topics; various information and details related to, and/or associated with, one or more root topics; one or more locations associated with the one or more root topics; and/or any other key features identified by the information source computing system and/or as desired by the provider of the SMS-based interactive information search and distribution system, and/or the provider of the information.

In one embodiment, all, or some, of the key features identified by the one or more processors associated with the information source computing system in the source topic data are also analyzed for potential use as "keywords" to be associated with a root topic and root topic related information search as discussed below.

In one embodiment, the key features identified by the one or more processors associated with the information source computing system in the source topic data are associated with the respective source topic data and used to categorize, correlate, and store the source topic data.

Below are two specific illustrative examples of two instances of source topic data obtained and processed by an information source computing system, e.g., a backend server, in one embodiment.

In this specific illustrative example, the first instance of source topic data is related to the topic "university" and regards the Indian Institute of Technology (IIT), a university system in India. We assume the following information is obtained: Campus locations of Bombay, Delhi, Madras, and Kharagpur; a list of degrees offered; a list of classes offered; courses scheduled for the coming secession; professors teaching; course fees/tuition; alumni; student interviews/testimonials; and alumni employment records.

In this specific illustrative example, the identified key features could be: ITT; university; India; degrees offered; classes offered; course schedule; faculty; campuses; fees/tuition; alumni, etc.

In this specific illustrative example, the second instance of source topic data is related to the topic "university" and regards the University of California, a university system in California. We assume the following information is obtained: Campus locations of Berkeley, Los Angeles, San Diego, Santa Cruz, Santa Barbara, and Irvine; a list of degrees offered; a list of classes offered; courses scheduled for the coming secession; professors teaching; course fees/tuition; alumni; student interviews/testimonials; and alumni employment records.

In this specific illustrative example, the identified key features could be: UC; university; California; degrees offered; classes offered; course schedule; faculty; campuses; fees/tuition; alumni, etc.

In one embodiment, a user sends initial search parameter data in the form of SMS text in an "original SMS text message" to the SMS-based interactive information search and distribution system.

As noted above, Short Message Service (SMS) is the text communication service component of phone, web, or mobile communication systems. As also noted above, SMS uses relatively rigid standardized communications protocols that allow the exchange of only very short text messages between fixed line or mobile phone devices.

Currently, SMS text messaging is the most widely used data application in the world, with 2.4 billion active users, or 74% of all mobile phone subscribers. However, due to the current limits on the size of messages, and very simple/lightweight user interfaces (U/Is) associated with mobile phones and SMS, SMS, as historically implemented, did not readily, easily, or efficiently, lend itself to being used as an interactive information search and distribution means. Consequently, the prevailing historical view was that a SMS-based interactive information search and distribution system was impractical, if not impossible. Consequently, historically, information sent via SMS was typically limited to one-way blast SMS messages that were static and were often considered an annoyance, to be largely ignored, by the receiving consumer/user.

In one embodiment, the original SMS text message sent by the user to the SMS-based interactive information search and distribution system includes an initial search parameter that indicates a root topic of interest, i.e., a topic of interest, and for which the user would like to obtain information.

In one embodiment, the original SMS text message sent by the user to the SMS-based interactive information search and distribution system also includes one or more other initial search parameters associated with the root topic of interest, and/or the user. In various embodiments, the one or more other initial search parameters associated with the root topic of interest, and/or the user include, but are not limited to, one or more of: the user's/consumer's location, or a desired location; any key areas of interest; or any other desired search parameter associated with the root topic of interest that can be set forth in a SMS text format, and under SMS text message constraints, in a single SMS text message.

Continuing with the one specific illustrative example discussed above, an illustrative example of an original SMS text message sent to the SMS-based interactive information search and distribution system by a given user looking for information regarding "university" would include the initial search parameter data word "university".

In one embodiment, the initial search parameter data from original SMS text message is used to search the source topic data representing information related to, and/or associated with, one or more root topics by one or more processors associated with one or more computing systems, such as one or more processors associated with the information source computing system.

In one embodiment, as a result of the search of the source topic data representing information related to, and/or associated with, one or more root topics by one or more processors associated with one or more computing systems, one or more "matched root topics" that match, or most closely match, the initial search parameter data are identified.

In one embodiment, a defined number of the "top" or most closely matched "matched root topics" are selected. In one embodiment, the defined number of the most closely matched "matched root topics" is chosen based on the limitations imposed by the SMS protocol. As an example, in one embodiment the two most closely matched "matched root topics" are selected. In another example, in one embodiment, the three most closely matched "matched root topics" are selected.

In one embodiment, the selected "matched root topics" are specially formatted with keywords highlighted and sent to the user in a "SMS search response text message" via SMS. In one embodiment, the selected "matched root topics" are specially formatted with keywords highlighted and automatically sent to user in a "SMS search response text message" via SMS by one or more processors associated with the information source computing system.

As noted above, in one embodiment, one or more "keywords" in the selected "matched root topics" of the "SMS search response text message" are bracketed, or otherwise highlighted. In one embodiment, the bracketing, or other highlighting, is used to indicate to the user that more information is available regarding the keywords.

In one embodiment, if the user desires more information associated with a bracketed, or otherwise highlighted, keyword, the user need only send back a "follow-up SMS text message" that includes the bracketed, or otherwise highlighted, keyword, or an indicated phrase including the keyword.

Continuing with the one specific illustrative example discussed above, recall that the illustrative example of an original SMS text message sent to the SMS-based interactive information search and distribution system by a given user looking for information about universities included the initial search parameter data word "university".

In this specific illustrative example, the two instances of source topic data obtained and processed, i.e., information regarding the Indian Technical Institute and the University of California, would match the initial search parameter data of "university".

Therefore, in this specific illustrative example, both the source topic data regarding the Indian Technical Institute and the University of California would be listed as "matched root topics". Consequently, an illustrative example of an "SMS search response text message" sent via SMS by one or more processors associated with the information source computing system would include the following text:

"[IIT] university"

"[UC] university"

As seen above, both the words "IIT" and "UC" are keywords and are therefore bracketed as "[IIT]" and "[UC]" indicating that more information is available for both the keywords "IIT" and "UC".

In one embodiment, the keywords are flexibly selected and defined, and are inferred from the context of original SMS text message and the initial search parameters.

In one embodiment, the user sends a "follow-up SMS text message" that includes the keyword, or an indicated phrase including the keyword.

Continuing with the one specific illustrative example discussed above, recall that, in this specific example, the "SMS search response text message" sent via SMS by one or more processors associated with the information source computing system included the keywords "[IIT]" and "[UC]". Consequently, in this specific example, the "follow-up SMS text message" could include the follow-up phrase "more IIT" indicating the user desires more information associated with the Indian Technical Institute.

In one embodiment, the source topic data representing information related to, and/or associated with, one or more root topics is searched for information not only matching the keyword designated in the "follow-up SMS text message" from the user, but also matching, or consistent with the context of, the initial search parameters of the original SMS text message from the user.

In one embodiment, as a result of the search of the source topic data representing information related to, and/or associated with, one or more root topics using the keyword designated in the "follow-up SMS text message", one or more "keyword matched root topics" that include the designated keyword and match, or most closely match, the initial search parameter data are identified.

In one embodiment, a defined number of the "top" or most closely matched "keyword matched root topics" are selected. In one embodiment, the defined number of the most closely matched "keyword matched root topics" is chosen based on the limitations imposed by the SMS protocol. As an example, in one embodiment, the two most closely matched "keyword matched root topics" are selected. In another example, in one embodiment, the three most closely matched "keyword matched root topics" are selected.

In one embodiment, the selected "keyword matched root topics" are again specially formatted with keywords highlighted and sent to the user in a "SMS keyword search response text message" via SMS. In one embodiment, the selected "keyword matched root topics" are specially formatted with keywords highlighted and automatically sent to user in a "SMS keyword search response text message" via SMS by one or more processors associated with the information source computing system.

In various embodiments, the exchange of "follow-up SMS text messages" including designated keywords, or keyword response phrases, and "SMS keyword search response text messages" including "keyword matched root topics" and additional highlighted keywords, can be repeated as many times as the user desires until the desired level of information specificity is attained. Consequently, in the "follow-up SMS text message", or subsequent "follow-up SMS text messages", the user can use the highlighted keywords to define, and automatically request, further refined searches and, in one embodiment, these further refined searches are performed while interpreting the added search parameters, in the form of the identified keywords, within the context of all the initial parameters, and all keywords, identified thus far.

As noted above, in various embodiments, the keywords are flexible, dynamic, and inferred and selected based, at least in part, on the content, and within the context, of the set of SMS text messages sent and the root topic and root topic related information itself. Consequently, in one embodiment, a thread, or tree, of related root topic and root topic related information searches associated with a thread of SMS text messages is created to provide the user with a fully interactive information search and distribution system using a SMS communication channel, and within the constraints of the SMS protocols.

Continuing with the one specific illustrative example discussed above, recall that the user's "follow-up SMS text message" included the follow-up phrase "more IIT" indicating the user desired more information associated with the "IIT", the Indian Technical Institute. Consequently, in this specific illustrative example, the "SMS keyword search response text message" would include the following text indicating the "keyword matched root topics" of:

"[IIT] [campuses], [degrees], [courses]"

As seen above, the words "IIT", "campuses", "degrees", "courses" are keywords and are therefore bracketed as [IIT], [campuses], [degrees], [courses] indicating not only that more information is available for the keywords "campuses", "degrees", "courses", but also that even more information than is listed in this "SMS keyword search response text message" regarding the "IIT" is available.

In this specific example, the user may send back a second "follow-up SMS text message" including the follow-up phrase "more campuses". In this case, a second "SMS keyword search response text message" would include the following text indicating the second "keyword matched root topics" of:

"[IIT], [Bombay], [Delhi], [Madras], [Kharagpur]"

As seen above, the words "IIT", "Bombay", "Delhi", "Madras", and "Kharagpur" are keywords and are therefore bracketed as [Bombay], [Delhi], [Madras], [Kharagpur] indicating not only that more information is available for the keywords "Bombay", "Delhi", "Madras", and "Kharagpur", such as classes, class schedules, faculty, or contact information or addresses, but also that even more information than is listed in this second "SMS keyword search response text message" regarding the "IIT" is available.

In one embodiment, should the user desire to begin a new search, i.e., to reset the entire search and interaction process, the user need only resend the original SMS text message with initial search parameters.

Using the process for providing a SMS-based interactive information search and distribution system, as discussed herein, the keywords are flexibly and dynamically defined, inferred, selected, and interpreted, by the content, and within the context, of the set of SMS text messages sent and the root topic and root topic related information itself. Consequently, the SMS-based interactive information search and distribution systems provided using the process for providing a SMS-based interactive information search and distribution system, as discussed herein, are user friendly and their use/operation is intuitive for the user.

In addition, as discussed above, using the process for providing a SMS-based interactive information search and distribution system, a thread of root topic and root topic related information searches associated with a thread of SMS text messages is created to provide the user with a fully interactive information search and distribution system using a SMS communication channel, and within the constraints of the SMS protocols. Consequently, the severe limitations of SMS communication channels that had historically prevented SMS channels from being used as an interactive information search and distribution means are overcome. Therefore, using the process for providing a SMS-based interactive information search and distribution system, as discussed herein, many users/consumer in areas of the world having emerging economies can be provided more of the benefits of the information age and the benefits of interactive information searches and distribution.

Hardware Architecture

FIG. 1 is a block diagram of an exemplary hardware architecture for implementing one embodiment of a system and method for providing a SMS-based interactive information search and distribution system, such as exemplary process 200 discussed herein, that includes: a user mobile system 100, e.g., a user mobile phone or smart phone; an information source computing system 120, e.g., a backend server; a SMS communications link 130, and a database 170, coupled to information source computing system 120 via a network 140, such as the Internet.

As seen in FIG. 1, user mobile system 100 typically includes a processor 101, a memory system 103, a display 107, and a SMS/communications link interface 109.

In one embodiment, memory system 103 includes all, or part of, a SMS text messaging capability 105 that includes instructions and/or data for allowing a user of user mobile system 100 to send text messages via SMS/communications link interface 109 and SMS communications link 130.

In one embodiment, SMS/communications link interface 109 and SMS communications link 130 provides mobile system 100 the ability to send SMS text messages to, and receive SMS text messages from, information source computing system 120.

In various embodiments, user mobile system 100 is any "computing system" such as, but not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user mobile system 100 is any "mobile device" and/or "mobile computing system" such as, but not limited to: a mobile "computing system"; a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

Also seen in FIG. 1 is information source computing system 120 that typically includes a processor 121, and SMS/communications link 129; a network interface 131, and a memory system 123.

Figure 2:
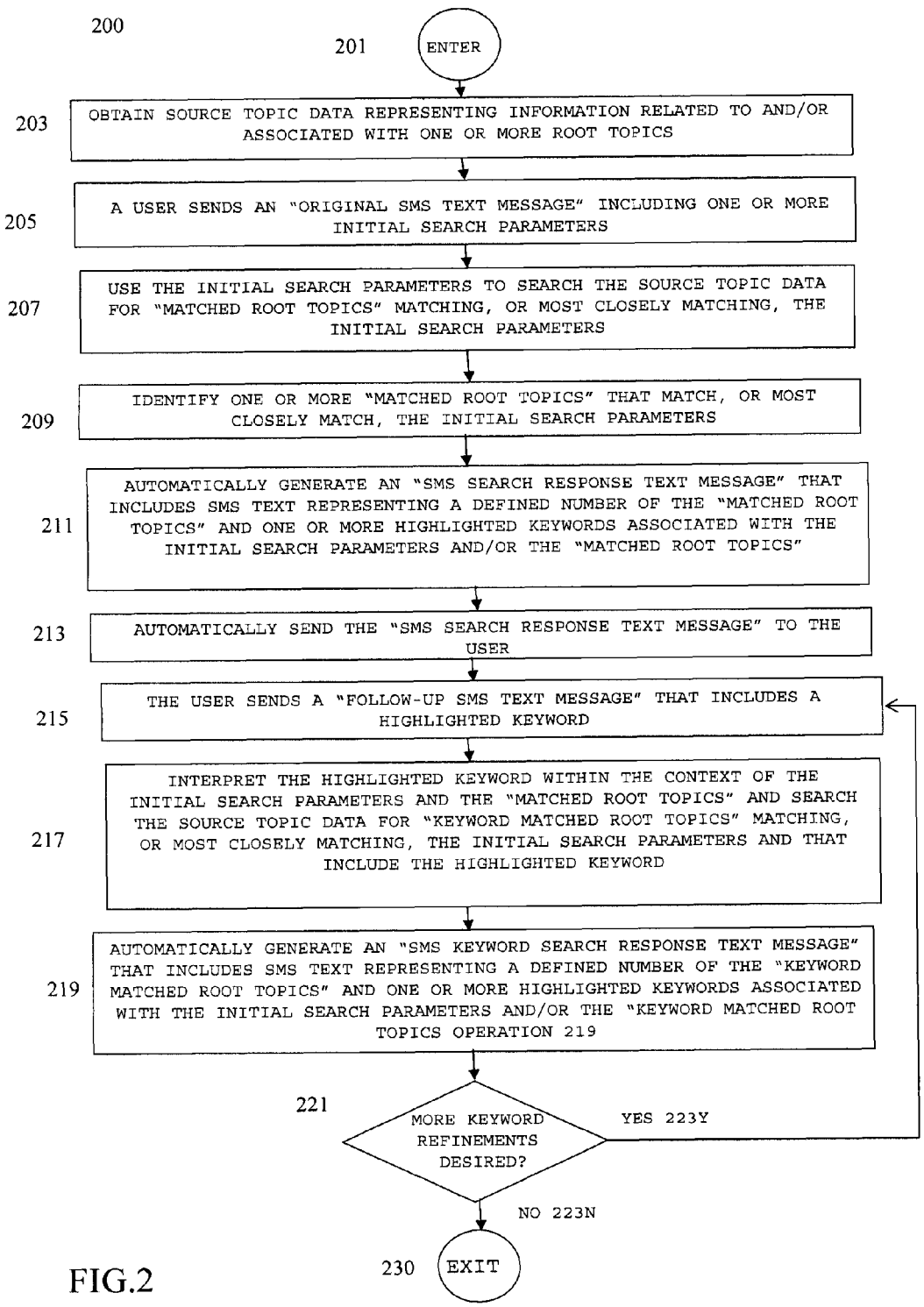
FIG. 2 is a flow chart depicting one embodiment of a process for providing a SMS-based interactive information search and distribution system in accordance with one embodiment.

In one embodiment, memory system 123 includes all, or part of, a process for providing a SMS-based interactive information search and distribution system, such as process 200 in FIG. 2.

In one embodiment, memory system 123 includes source topic data 127, including data associated with, and/or related to, one or more root topics obtained from one or more sources, as discussed below.

In one embodiment, at least part of source topic data 127 is provided to memory system 123 from database 170 via a network interface 131 and network 140. In one embodiment, network 140 is the Internet.

In one embodiment, memory system 123 includes SMS message/search thread 125 associated with a tread of related SMS messages and searches performed on behalf of user of mobile system 100 via two or more SMS messages, as discussed in more detail below. Those of skill in the art will note that SMS message/search thread 125 can be symbolic of multiple treads of related SMS messages and searches perform on behalf of multiple users, or a single user of mobile system 100, via multiple SMS messages, as discussed in more detail below.

In one embodiment, SMS message/search thread 125 includes initial parameters data 125A, received, in one embodiment via an "original SMS text message" from user mobile system 100 and a user of mobile system 100, as discussed in more detail below.

In one embodiment, SMS message/search thread 125 includes matched source topic data 125B that, as discussed below, includes data representing "matched root topics", i.e., information matching, or most closely matching, the initial search parameters and as detected in a search of source topic data 127 using initial parameters data 125A.

In one embodiment, SMS message/search thread 125 includes keywords data 125C that, as discussed below, includes one or more keywords highlighted in the matched root topics data 125B.

In one embodiment, SMS message/search thread 125 includes keyword matched source topic data 125D that, in one embodiment, as discussed below, includes data representing "keyword matched root topics", i.e., information matching, or most closely matching, the initial search parameters and as detected in a search of source topic data 127 using initial parameters data 125A and that include one or more of the keywords of keywords data 125C.

In one embodiment, SMS message/search thread 125 includes SMS text messages data 125E that includes all, or part, of data associated with SMS messages generated by either party in the course of the electronic marketing device search associated with SMS message/search thread 125.

In one embodiment, information source computing system 120 is a backend server accessible by a user and/or a business and is used and/or accessible by another computing system, such as user mobile system 100.

In one embodiment, information source computing system 120 a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for providing a SMS-based interactive information search and distribution system, and/or a computing system implemented data management system, in accordance with at least one of the embodiments as described herein.

In various embodiments, information source computing system 120 is any "computing system" such as, but not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, information source computing system 120 is any "mobile device" and/or "mobile computing system" such as, but not limited to: a mobile "computing system"; a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

As seen in FIG. 1, in one embodiment, information source computing system 120 includes SMS/communications link interface 129 for connecting to SMS communications link 130. In one embodiment, SMS/communications link interface 129, and SMS communications link 130, provide information source computing system 120 the ability to send SMS text messages to, and receive SMS text messages from, mobile system 100.

SMS communications link 130 is any SMS communication link as discussed herein, and/or as known in the art at the time of filing, and/or as developed after the time of filing. As noted above, Short Message Service (SMS) is the text communication service component of phone, web, or mobile communication systems. As also noted above, SMS uses relatively rigid standardized communications protocols that allow the exchange of only very short text messages between fixed line or mobile phone devices.

Currently, SMS text messaging is the most widely used data application in the world, with 2.4 billion active users, or 74% of all mobile phone subscribers. However, due to the current limits on the size of messages, and very simple/lightweight user interfaces (U/Is) associated with mobile phones and SMS, SMS, as historically implemented, did not readily, easily, or efficiently, lend itself to being used as an interactive information search and distribution means. Consequently, the prevailing historical view was that a SMS-based interactive information search and distribution system was impractical, if not impossible. Consequently, historically, information sent via SMS was typically limited to one-way blast SMS messages that were static and were often considered an annoyance, to be largely ignored, by the receiving consumer/user.

Also shown in FIG. 1 is exemplary database 170. In one embodiment, database 170 is a data storage device, a designated server system or computing system, or a designated portion of one or more server systems or computing systems, such as computing system 120, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of the user, and/or the user's agents, and/or process for providing a SMS-based interactive information search and distribution system, such as exemplary process 200. As discussed in more detail below, in one embodiment, database 170 is under the control of the business owner/manager, and/or the business owner's/manager's agents.

In various embodiments, database 170 can contain all, or part, of any data related to process for providing a SMS-based interactive information search and distribution system, such as exemplary process 200, as discussed herein, and/or as known in the art at the time of filing, and/or as developed after the time of filing.

As shown in FIG. 1, in one embodiment, information source computing system 120, and database 170, are coupled to network 140. Network 140 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

In various embodiments, any one or more of user mobile system 100, information source computing system 120, and/or database 170 are part of a cloud computing environment.

Those of skill in the art will readily recognize that the components shown in FIG. 1, such as user mobile system 100, information source computing system 120, and/or databases 170, and their respective components, are shown for illustrative purposes only and that architectures with more or fewer components can implement, and benefit from, the invention. Moreover, one or more components of user mobile system 100, information source computing system 120, and/or database 170, may be located remotely from their respective system and accessed via network, as discussed herein. In addition, the particular type of, and configuration of, user mobile system 100, information source computing system 120, and/or database 170, are not relevant.

As discussed in more detail below, in one embodiment, a process for providing a SMS-based interactive information search and distribution system, such as process for providing a SMS-based interactive information search and distribution system 200, and/or any data associated with a process for providing a SMS-based interactive information search and distribution system, such as process for providing a SMS-based interactive information search and distribution system 200, are stored, in whole, or in part, in memory system 103 of user mobile system 100, and/or in memory system 123, and/or in database 170, and executed on user mobile system 100 and/or information source computing system 120. As used herein, a memory refers to a volatile memory, a non-volatile memory, or any combination of the two.

Although a process for providing a SMS-based interactive information search and distribution system, such as process for providing a SMS-based interactive information search and distribution system 200, and/or any data associated with a process for providing a SMS-based interactive information search and distribution system, such as process for providing a SMS-based interactive information search and distribution system 200, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing a SMS-based interactive information search and distribution system, such as process for providing a SMS-based interactive information search and distribution system 200, and/or any data associated with a process for providing a SMS-based interactive information search and distribution system, such as process for providing a SMS-based interactive information search and distribution system 200 are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as processors 101 and/or 121. In one embodiment, execution of a process by processors 101 and/or 121 results in the operations of an agent computer process (not shown) and/or a rule computer process (not shown).

In one embodiment, a process for providing a SMS-based interactive information search and distribution system, such as process for providing a SMS-based interactive information search and distribution system 200, and/or any data associated with a process for providing a SMS-based interactive information search and distribution system, such as process for providing a SMS-based interactive information search and distribution system 200, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as information source computing system 120 of FIG. 1, or other media or process capable of delivering computer readable data representing computer readable code, whether available or known at the time of filing or as later developed. This medium may belong to a computing system. However, in some embodiments, the medium also may be removable and/or remote from the computing system.

In one embodiment, the computing systems and/or server systems, such as computing system 120 running and/or utilizing and/or storing all, or part, of a process for providing a SMS-based interactive information search and distribution system, such as process for providing a SMS-based interactive information search and distribution system 200, and/or any data associated with a process for providing a SMS-based interactive information search and distribution system, such as process for providing a SMS-based interactive information search and distribution system 200, is a portable computer, a workstation, a two-way pager, a cellular telephone, a smart phone, a digital wireless telephone, a PDA, a server computer, an Internet appliance, or any other device that includes components that can execute all, or part, of a process for providing a SMS-based interactive information search and distribution system in accordance with at least one of the embodiments as described herein. Similarly, in another embodiment, a process for providing a SMS-based interactive information search and distribution system, such as process for providing a SMS-based interactive information search and distribution system 200, and/or any data associated with a process for providing a SMS-based interactive information search and distribution system, such as process for providing a SMS-based interactive information search and distribution system 200, may be implemented on, and/or run, and/or stored on, a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein.

Process

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Herein, the term "mobile device" and/or "mobile computing system", or "mobile system" are used interchangeable and include, but are not limited to: a mobile "computing system"; a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed. As used herein the term "network" also includes, but is not limited to, any mobile communication network.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In accordance with one embodiment, a process for providing a SMS-based interactive information search and distribution system includes a process for providing a SMS-based interactive information search and distribution system whereby, in one embodiment, data representing information related to, and/or associated with, one or more topics is obtained. In one embodiment, key features, and/or potential keywords, associated with the source topic data are identified and associated with the respective source topic data. In one embodiment, a user sends initial search parameter data in the form of SMS text in an "original SMS text message". In one embodiment, the "original SMS text message" includes an initial search parameter that indicates a root topic of interest, i.e., a topic of interest, and for which the user would like to obtain information. In one embodiment, the "original SMS text message" also includes one or more other initial search parameters associated with the root topic of interest, and/or the user, such as refinements of the initial search parameters or a location of the user. In one embodiment, the initial search parameter data from the "original SMS text message" is used to search the source topic data representing information related to, and/or associated with, one or more root topics. In one embodiment, a "SMS search response text message" is automatically generated and sent back to the user that includes SMS text representing a defined number of the "top" "matched root topics", i.e., information matching, or most closely matching, the initial search parameters. In one embodiment, one or more keywords in the SMS text in the "SMS search response text message" representing the "matched root topics" are bracketed, or otherwise highlighted, to indicate that more information is available regarding the keywords. In one embodiment, if the user desires more information regarding the keywords, the user need only send a "follow-up SMS text message" back that includes the keyword, or an indicated phrase including the keyword. In one embodiment, the keywords are flexible and inferred within the context of the "original SMS text message" and the initial search parameters. In one embodiment, if the user sends a "follow-up SMS text message" that includes the keyword, or an indicated phrase including the keyword, the source topic data representing information related to, and/or associated with, one or more root topics is again searched for "keyword matched root topics" not only matching the keyword but also matching, or consistent with the context of, the initial search parameters of the "original SMS text message" from the user, and/or the "matched root topics". Consequently, using the "follow-up SMS text message", or subsequent "follow-up SMS messages", the user can select the highlighted keyword, and/or keyword phrase response, to define, and automatically request, a further refined search and, in one embodiment, these further refined searches are made using the added search parameters, in the form of the identified keywords, as interpreted within the context of all the initial parameters, and all keywords identified thus far. Consequently, in one embodiment, a series of linked, refined, and evolving root topic and root topic related information searches are performed in association with a thread of SMS text messages to provide the user with a fully interactive information search and distribution system using a SMS communication channel, and within the constraints of the SMS protocols.

FIG. 2 is a flow chart depicting a process for providing a SMS-based interactive information search and distribution system 200 in accordance with one embodiment. Process for providing a SMS-based interactive information search and distribution system 200 begins at ENTER OPERATION 201 of FIG. 2 and process flow proceeds to OBTAIN SOURCE TOPIC DATA REPRESENTING INFORMATION RELATED TO, AND/OR ASSOCIATED WITH, ONE OR MORE ROOT TOPICS OPERATION 203.

In one embodiment, at OBTAIN SOURCE TOPIC DATA REPRESENTING INFORMATION RELATED TO, AND/OR ASSOCIATED WITH, ONE OR MORE ROOT TOPICS OPERATION 203 data representing information related to, and/or associated with, one or more topics is obtained.

In one embodiment, at OBTAIN SOURCE TOPIC DATA REPRESENTING INFORMATION RELATED TO, AND/OR ASSOCIATED WITH, ONE OR MORE ROOT TOPICS OPERATION 203 source topic data, such as source topic data 127 of FIG. 1, representing information related to, and/or associated with, one or more topics is obtained from one or more sources.

Returning to FIG. 2, in one embodiment, at OBTAIN SOURCE TOPIC DATA REPRESENTING INFORMATION RELATED TO, AND/OR ASSOCIATED WITH, ONE OR MORE ROOT TOPICS OPERATION 203 the source topic data is obtained by an information source computing system, e.g., a backend server system, such as information source computing system 120 of FIG. 1.

Returning to FIG. 2, in one embodiment, at OBTAIN SOURCE TOPIC DATA REPRESENTING INFORMATION RELATED TO, AND/OR ASSOCIATED WITH, ONE OR MORE ROOT TOPICS OPERATION 203 the source topic data is obtained by an information source computing system, e.g., a backend server system, from one or sources of information data via a network, such as the Internet or in the form of a computer program product. In one embodiment, at OBTAIN SOURCE TOPIC DATA REPRESENTING INFORMATION RELATED TO, AND/OR ASSOCIATED WITH, ONE OR MORE ROOT TOPICS OPERATION 203 the source topic data is obtained by an information source computing system, e.g., a backend server system, in the form of Extensible Markup Language (XML) via a network, such as the Internet.

In one embodiment, at OBTAIN SOURCE TOPIC DATA REPRESENTING INFORMATION RELATED TO, AND/OR ASSOCIATED WITH, ONE OR MORE ROOT TOPICS OPERATION 203 one or more processors, such as processor 121 of FIG. 1, associated with one or more computing systems, such as information source computing system 120 of FIG. 1, identify parameters or "key features" associated with the source topic data.

In various embodiments, the key features can include, but are not limited to, any one or more of the following: one or more root topics; the general and/or specific sub-topics associated with the one or more root topics; names associated with the one or more root topics; other root topics related to, and/or associated with, the one or more root topics; various information and details related to, and/or associated with, one or more root topics; one or more locations associated with the one or more root topics; and/or any other key features identified by the information source computing system and/or as desired by the provider of the SMS-based interactive information search and distribution system, and/or the provider of the information.

In one embodiment, at OBTAIN SOURCE TOPIC DATA REPRESENTING INFORMATION RELATED TO, AND/OR ASSOCIATED WITH, ONE OR MORE ROOT TOPICS OPERATION 203 all, or some, of the key features identified in the source topic data are also analyzed for potential use as keywords to be associated with a root topic and root topic related information as discussed below.

In one embodiment, at OBTAIN SOURCE TOPIC DATA REPRESENTING INFORMATION RELATED TO, AND/OR ASSOCIATED WITH, ONE OR MORE ROOT TOPICS OPERATION 203 the key features identified in the source topic data are associated with the respective source topic data and used to categorize, correlate, and store the source topic data.

Below are two specific illustrative examples of two instances of source topic data obtained and processed by an information source computing system, e.g., a backend server, in one embodiment.

In this specific illustrative example, the first instance of source topic data is related to the topic "university" and regards the Indian Institute of Technology (IIT), a university system in India. We assume the following information is obtained: campus locations of Bombay, Delhi, Madras, and Kharagpur; a list of degrees offered; a list of classes offered; courses scheduled for the coming secession; professors teaching; course fees/tuition; alumni; student interviews/testimonials; and alumni employment records.

In this specific illustrative example, the identified key features could be: ITT; university; India; degrees offered; classes offered; course schedule; faculty; campuses; fees/tuition; alumni, etc.

In this specific illustrative example, the second instance of source topic data is related to the topic "university" and regards the University of California, a university system in California. We assume the following information is obtained: Campus locations of Berkeley, Los Angeles, San Diego, Santa Cruz, Santa Barbara, and Irvine; a list of degrees offered; a list of classes offered; courses scheduled for the coming secession; professors teaching; course fees/tuition; alumni; student interviews/testimonials; and alumni employment records.

In this specific illustrative example, the identified key features could be: UC; university; California; degrees offered; classes offered; course schedule; faculty; campuses; fees/tuition; alumni, etc.

Returning to FIG. 2, in one embodiment, once data representing information related to, and/or associated with, one or more topics is obtained at OBTAIN SOURCE TOPIC DATA REPRESENTING INFORMATION RELATED TO, AND/OR ASSOCIATED WITH, ONE OR MORE ROOT TOPICS OPERATION 203 process flow proceeds to A USER SENDS AN "ORIGINAL SMS TEXT MESSAGE" INCLUDING ONE OR MORE INITIAL SEARCH PARAMETERS OPERATION 205.

In one embodiment, at A USER SENDS AN "ORIGINAL SMS TEXT MESSAGE" INCLUDING ONE OR MORE INITIAL SEARCH PARAMETERS OPERATION 205 a user sends initial search parameter data in the form of SMS text in an "original SMS text message".

In one embodiment, at A USER SENDS AN "ORIGINAL SMS TEXT MESSAGE" INCLUDING ONE OR MORE INITIAL SEARCH PARAMETERS OPERATION 205 a user sends initial search parameter data in the form of SMS text in an "original SMS text message" to the SMS-based interactive information search and distribution system.

As noted above, Short Message Service (SMS) is the text communication service component of phone, web, or mobile communication systems. As also noted above, SMS uses relatively rigid standardized communications protocols that allow the exchange of only very short text messages between fixed line or mobile phone devices.

Currently, SMS text messaging is the most widely used data application in the world, with 2.4 billion active users, or 74% of all mobile phone subscribers. However, due to the current limits on the size of messages, and very simple/lightweight user interfaces (U/Is) associated with mobile phones and SMS, SMS, as historically implemented, did not readily, easily, or efficiently, lend itself to being used as an interactive information search and distribution means. Consequently, the prevailing historical view was that a SMS-based interactive information search and distribution system was impractical, if not impossible. Consequently, historically, information sent via SMS was typically limited to one-way blast SMS messages that were static and were often considered an annoyance, to be largely ignored, by the receiving consumer/user.

In one embodiment, the original SMS text message of A USER SENDS AN "ORIGINAL SMS TEXT MESSAGE" INCLUDING ONE OR MORE INITIAL SEARCH PARAMETERS OPERATION 205 sent by the user to the SMS-based interactive information search and distribution system includes an initial search parameter that indicates a root topic of interest, i.e., a topic of interest, and for which the user would like to obtain information.

In one embodiment, the original SMS text message of A USER SENDS AN "ORIGINAL SMS TEXT MESSAGE" INCLUDING ONE OR MORE INITIAL SEARCH PARAMETERS OPERATION 205 sent by the user to the SMS-based interactive information search and distribution system also includes one or more other initial search parameters associated with the root topic of interest, and/or the user.

In various embodiments, the one or more other initial search parameters associated with the root topic of interest, and/or the user include, but are not limited to, one or more of: the user's/consumer's location, or a desired location; any key areas of interest; or any other desired search parameter associated with the root topic of interest that can be set forth in a SMS text format, and under SMS text message constraints, in a single SMS text message.

Continuing with the one specific illustrative example discussed above, an illustrative example of an original SMS text message sent to the SMS-based interactive information search and distribution system by a given user looking for information regarding "university" would include the initial search parameter data word "university".

In one embodiment, once a user sends initial search parameter data in the form of SMS text in an "original SMS text message" at A USER SENDS AN "ORIGINAL SMS TEXT MESSAGE" INCLUDING ONE OR MORE INITIAL SEARCH PARAMETERS OPERATION 205 process flow proceeds to USE THE INITIAL SEARCH PARAMETERS TO SEARCH THE SOURCE TOPIC DATA FOR "MATCHED ROOT TOPICS" MATCHING, OR MOST CLOSELY MATCHING, THE INITIAL SEARCH PARAMETERS OPERATION 207.

In one embodiment, at USE THE INITIAL SEARCH PARAMETERS TO SEARCH THE SOURCE TOPIC DATA FOR "MATCHED ROOT TOPICS" MATCHING, OR MOST CLOSELY MATCHING, THE INITIAL SEARCH PARAMETERS OPERATION 207 the initial search parameter data from the "original SMS text message" of A USER SENDS AN "ORIGINAL SMS TEXT MESSAGE" INCLUDING ONE OR MORE INITIAL SEARCH PARAMETERS OPERATION 205 is used to search the source topic data representing information related to, and/or associated with, one or more root topics A USER SENDS AN "ORIGINAL SMS TEXT MESSAGE" INCLUDING ONE OR MORE INITIAL SEARCH PARAMETERS OPERATION 205.

In one embodiment, at USE THE INITIAL SEARCH PARAMETERS TO SEARCH THE SOURCE TOPIC DATA FOR "MATCHED ROOT TOPICS" MATCHING, OR MOST CLOSELY MATCHING, THE INITIAL SEARCH PARAMETERS OPERATION 207 the initial search parameter data from the original SMS text message of A USER SENDS AN "ORIGINAL SMS TEXT MESSAGE" INCLUDING ONE OR MORE INITIAL SEARCH PARAMETERS OPERATION 205 is used to search the source topic data representing information related to, and/or associated with, one or more root topics, such as source topic data 127 of FIG. 1, by one or more processors, such as processor 121, associated with one or more computing systems, such information source computing system 120 of FIG. 1.

Returning to FIG. 2, in one embodiment, once the initial search parameter data from the "original SMS text message" is used to search the source topic data representing information related to, and/or associated with, one or more root topics at USE THE INITIAL SEARCH PARAMETERS TO SEARCH THE SOURCE TOPIC DATA FOR "MATCHED ROOT TOPICS" MATCHING, OR MOST CLOSELY MATCHING, THE INITIAL SEARCH PARAMETERS OPERATION 207 process flow proceeds to IDENTIFY ONE OR MORE "MATCHED ROOT TOPICS" THAT MATCH, OR MOST CLOSELY MATCH, THE INITIAL SEARCH PARAMETERS OPERATION 209.

In one embodiment, at IDENTIFY ONE OR MORE "MATCHED ROOT TOPICS" THAT MATCH, OR MOST CLOSELY MATCH, THE INITIAL SEARCH PARAMETERS OPERATION 209, as a result of the search of the source topic data representing information related to, and/or associated with, one or more root topics of USE THE INITIAL SEARCH PARAMETERS TO SEARCH THE SOURCE TOPIC DATA FOR "MATCHED ROOT TOPICS" MATCHING, OR MOST CLOSELY MATCHING, THE INITIAL SEARCH PARAMETERS OPERATION 207, one or more "matched root topics" that match, or most closely match, the initial search parameter data are identified.

In one embodiment, once one or more "matched root topics" that match, or most closely match, the initial search parameter data are identified at IDENTIFY ONE OR MORE "MATCHED ROOT TOPICS" THAT MATCH, OR MOST CLOSELY MATCH, THE INITIAL SEARCH PARAMETERS OPERATION 209 process flow proceeds to AUTOMATICALLY GENERATE AN "SMS SEARCH RESPONSE TEXT MESSAGE" THAT INCLUDES SMS TEXT REPRESENTING A DEFINED NUMBER OF THE "MATCHED ROOT TOPICS" AND ONE OR MORE HIGHLIGHTED KEYWORDS ASSOCIATED WITH THE INITIAL SEARCH PARAMETERS AND/OR THE "MATCHED ROOT TOPICS" OPERATION 211.

In one embodiment, at AUTOMATICALLY GENERATE AN "SMS SEARCH RESPONSE TEXT MESSAGE" THAT INCLUDES SMS TEXT REPRESENTING A DEFINED NUMBER OF THE "MATCHED ROOT TOPICS" AND ONE OR MORE HIGHLIGHTED KEYWORDS ASSOCIATED WITH THE INITIAL SEARCH PARAMETERS AND/OR THE "MATCHED ROOT TOPICS" OPERATION 211 an "SMS search response text message" is automatically generated that includes SMS text representing a defined number of the "top" "matched root topics", i.e., information matching, or most closely matching, the initial search parameters and one or more highlighted keywords.

In one embodiment, at AUTOMATICALLY GENERATE AN "SMS SEARCH RESPONSE TEXT MESSAGE" THAT INCLUDES SMS TEXT REPRESENTING A DEFINED NUMBER OF THE "MATCHED ROOT TOPICS" AND ONE OR MORE HIGHLIGHTED KEYWORDS ASSOCIATED WITH THE INITIAL SEARCH PARAMETERS AND/OR THE "MATCHED ROOT TOPICS" OPERATION 211 a defined number of the "top" or most closely matched "matched root topics" of IDENTIFY ONE OR MORE "MATCHED ROOT TOPICS" THAT MATCH, OR MOST CLOSELY MATCH, THE INITIAL SEARCH PARAMETERS OPERATION 209 are selected.

In one embodiment, at AUTOMATICALLY GENERATE AN "SMS SEARCH RESPONSE TEXT MESSAGE" THAT INCLUDES SMS TEXT REPRESENTING A DEFINED NUMBER OF THE "MATCHED ROOT TOPICS" AND ONE OR MORE HIGHLIGHTED KEYWORDS ASSOCIATED WITH THE INITIAL SEARCH PARAMETERS AND/OR THE "MATCHED ROOT TOPICS" OPERATION 211 the defined number of the most closely matched "matched root topics" is chosen based on the limitations imposed by the SMS protocol. As an example, in one embodiment the two most closely matched "matched root topics" are selected. In another example, in one embodiment, the three most closely matched "matched root topics" are selected.

In one embodiment, at AUTOMATICALLY GENERATE AN "SMS SEARCH RESPONSE TEXT MESSAGE" THAT INCLUDES SMS TEXT REPRESENTING A DEFINED NUMBER OF THE "MATCHED ROOT TOPICS" AND ONE OR MORE HIGHLIGHTED KEYWORDS ASSOCIATED WITH THE INITIAL SEARCH PARAMETERS AND/OR THE "MATCHED ROOT TOPICS" OPERATION 211 the selected "matched root topics" are specially formatted with keywords highlighted. In one embodiment, the selected "matched root topics" are specially formatted with keywords highlighted by one or more processors, such as processor 121 of FIG. 1, associated with one or more computing systems, such as information source computing system 120 of FIG. 1.

Returning to FIG. 2, as noted above, in one embodiment, one or more "keywords" in the selected "matched root topics" of the "SMS search response text message" are bracketed, or otherwise highlighted. In one embodiment, the bracketing or other highlighting is used to indicate to the user that more information is available regarding the keywords.

As discussed below, in one embodiment, if the user desires more information associated with a bracketed, or otherwise highlighted, keyword, the user need only send back a "follow-up SMS text message" that includes the bracketed, or otherwise highlighted, keyword, or an indicated phrase including the keyword.

Continuing with the one specific illustrative example discussed above, recall that the illustrative example of an original SMS text message sent to the SMS-based interactive information search and distribution system by a given user looking for information about universities included the initial search parameter data word "university".

In this specific illustrative example, the two instances of source topic data obtained and processed, i.e., information regarding the Indian Technical Institute and the University of California, would match the initial search parameter data of "university".

Therefore, in this specific illustrative example, both the source topic data regarding the Indian Technical Institute and the University of California would be listed as "matched root topics". Consequently, an illustrative example of an "SMS search response text message" sent via SMS by one or more processors associated with the information source computing system would include the following text:

i. "[IIT] university"
"[UC] university"

As seen above, both the words "IIT" and "UC" are keywords and are therefore bracketed as "[IIT]" and "[UC]" indicating that more information is available for both the keywords "IIT" and "UC".

Returning to FIG. 2, in one embodiment, once an "SMS search response text message" is automatically generated that includes SMS text representing a defined number of the "top" "matched root topics", i.e., information matching, or most closely matching, the initial search parameters and one or more highlighted keywords at AUTOMATICALLY GENERATE AN "SMS SEARCH RESPONSE TEXT MESSAGE" THAT INCLUDES SMS TEXT REPRESENTING A DEFINED NUMBER OF THE "MATCHED ROOT TOPICS" AND ONE OR MORE HIGHLIGHTED KEYWORDS ASSOCIATED WITH THE INITIAL SEARCH PARAMETERS AND/OR THE "MATCHED ROOT TOPICS" OPERATION 211 process flow proceeds to AUTOMATICALLY SEND THE "SMS SEARCH RESPONSE TEXT MESSAGE" TO THE USER OPERATION 213.

In one embodiment, at AUTOMATICALLY SEND THE "SMS SEARCH RESPONSE TEXT MESSAGE" TO THE USER OPERATION 213 the "SMS search response text message" automatically generated that includes SMS text representing a defined number of the "top" "matched root topics", i.e., information matching, or most closely matching, the initial search parameters and one or more highlighted keywords of AUTOMATICALLY GENERATE AN "SMS SEARCH RESPONSE TEXT MESSAGE" THAT INCLUDES SMS TEXT REPRESENTING A DEFINED NUMBER OF THE "MATCHED ROOT TOPICS" AND ONE OR MORE HIGHLIGHTED KEYWORDS ASSOCIATED WITH THE INITIAL SEARCH PARAMETERS AND/OR THE "MATCHED ROOT TOPICS" OPERATION 211 is automatically sent to the user via a SMS communication link.

In one embodiment, at AUTOMATICALLY SEND THE "SMS SEARCH RESPONSE TEXT MESSAGE" TO THE USER OPERATION 213 the "SMS search response text message" automatically generated that includes SMS text representing a defined number of the "top" "matched root topics", i.e., information matching, or most closely matching, the initial search parameters and one or more highlighted keywords of AUTOMATICALLY GENERATE AN "SMS SEARCH RESPONSE TEXT MESSAGE" THAT INCLUDES SMS TEXT REPRESENTING A DEFINED NUMBER OF THE "MATCHED ROOT TOPICS" AND ONE OR MORE HIGHLIGHTED KEYWORDS ASSOCIATED WITH THE INITIAL SEARCH PARAMETERS AND/OR THE "MATCHED ROOT TOPICS" OPERATION 211 is automatically sent by one or more processors, such as processor 121 of FIG. 1, associated with one or more computing systems, such as information source computing system 120 of FIG. 1, to the user, such as user mobile system 100 of FIG. 1 via a SMS communication link, such as SMS communications link 130 of FIG. 1.

Returning to FIG. 2, in one embodiment, once the "SMS search response text message" automatically generated that includes SMS text representing a defined number of the "top" "matched root topics", i.e., information matching, or most closely matching, the initial search parameters and one or more highlighted keywords of AUTOMATICALLY GENERATE AN "SMS SEARCH RESPONSE TEXT MESSAGE" THAT INCLUDES SMS TEXT REPRESENTING A DEFINED NUMBER OF THE "MATCHED ROOT TOPICS" AND ONE OR MORE HIGHLIGHTED KEYWORDS ASSOCIATED WITH THE INITIAL SEARCH PARAMETERS AND/OR THE "MATCHED ROOT TOPICS" OPERATION 211 is automatically sent to the user via a SMS communication link at AUTOMATICALLY SEND THE "SMS SEARCH RESPONSE TEXT MESSAGE" TO THE USER OPERATION 213, process flow proceeds to THE USER SENDS A "FOLLOW-UP SMS TEXT MESSAGE" THAT INCLUDES A HIGHLIGHTED KEYWORD OPERATION 215.

In one embodiment, at THE USER SENDS A "FOLLOW-UP SMS TEXT MESSAGE" THAT INCLUDES A HIGHLIGHTED KEYWORD OPERATION 215 the user sends a "follow-up SMS text message" that includes the keyword, or an indicated phrase including the keyword, of AUTOMATICALLY SEND THE "SMS SEARCH RESPONSE TEXT MESSAGE" TO THE USER OPERATION 213.

In one embodiment, at THE USER SENDS A "FOLLOW-UP SMS TEXT MESSAGE" THAT INCLUDES A HIGHLIGHTED KEYWORD OPERATION 215 the user sends a "follow-up SMS text message" that includes the keyword, or an indicated phrase including the keyword, via a user mobile system, such as user mobile system 100 of FIG. 1, and a SMS communication link, such as SMS communications link 130 of FIG. 1.

Continuing with the one specific illustrative example discussed above, recall that, in this specific example, the "SMS search response text message" sent via SMS by one or more processors associated with the information source computing system included the keywords "[IIT]" and "[UC]". Consequently, in this specific example, the "follow-up SMS text message" could include the follow-up phrase "more IIT" indicating the user desires more information associated with the Indian Technical Institute.

Returning to FIG. 2, in one embodiment, once the user sends a "follow-up SMS text message" that includes the keyword, or an indicated phrase including the keyword, of AUTOMATICALLY SEND THE "SMS SEARCH RESPONSE TEXT MESSAGE" TO THE USER OPERATION 213 at THE USER SENDS A "FOLLOW-UP SMS TEXT MESSAGE" THAT INCLUDES A HIGHLIGHTED KEYWORD OPERATION 215, process flow proceeds to INTERPRET THE HIGHLIGHTED KEYWORD WITHIN THE CONTEXT OF THE INITIAL SEARCH PARAMETERS AND THE "MATCHED ROOT TOPICS" AND SEARCH THE SOURCE TOPIC DATA FOR "KEYWORD MATCHED ROOT TOPICS" MATCHING, OR MOST CLOSELY MATCHING, THE INITIAL SEARCH PARAMETERS AND THAT INCLUDE THE HIGHLIGHTED KEYWORD OPERATION 217.

In one embodiment, at INTERPRET THE HIGHLIGHTED KEYWORD WITHIN THE CONTEXT OF THE INITIAL SEARCH PARAMETERS AND THE "MATCHED ROOT TOPICS" AND SEARCH THE SOURCE TOPIC DATA FOR "KEYWORD MATCHED ROOT TOPICS" MATCHING, OR MOST CLOSELY MATCHING, THE INITIAL SEARCH PARAMETERS AND THAT INCLUDE THE HIGHLIGHTED KEYWORD OPERATION 217 the source topic data representing information related to, and/or associated with, one or more root topics of OBTAIN SOURCE TOPIC DATA REPRESENTING INFORMATION RELATED TO, AND/OR ASSOCIATED WITH, ONE OR MORE ROOT TOPICS OPERATION 203 is again searched for "keyword matched root topics" that not only match, or include, using the keyword of THE USER SENDS A "FOLLOW-UP SMS TEXT MESSAGE" THAT INCLUDES A HIGHLIGHTED KEYWORD OPERATION 215 but also match, or are consistent with the context of, the initial search parameters of the "original SMS text message" from the user of A USER SENDS AN "ORIGINAL SMS TEXT MESSAGE" INCLUDING ONE OR MORE INITIAL SEARCH PARAMETERS OPERATION 205, and/or the "matched root topics" of IDENTIFY ONE OR MORE "MATCHED ROOT TOPICS" THAT MATCH, OR MOST CLOSELY MATCH, THE INITIAL SEARCH PARAMETERS OPERATION 209.

In one embodiment, at INTERPRET THE HIGHLIGHTED KEYWORD WITHIN THE CONTEXT OF THE INITIAL SEARCH PARAMETERS AND THE "MATCHED ROOT TOPICS" AND SEARCH THE SOURCE TOPIC DATA FOR "KEYWORD MATCHED ROOT TOPICS" MATCHING, OR MOST CLOSELY MATCHING, THE INITIAL SEARCH PARAMETERS AND THAT INCLUDE THE HIGHLIGHTED KEYWORD OPERATION 217 the source topic data representing information related to, and/or associated with, one or more root topics is again searched for "keyword matched root topics" that not only match, or include, the keyword, but also match, or are consistent with the context of, the initial search parameters of the "original SMS text message" from the user, and/or the "matched root topics" by one or more processors, such as processor 121 of FIG. 1, associated with one or more computing systems, such as information source computing system 120 of FIG. 1.

Returning to FIG. 2, in one embodiment, once the source topic data representing information related to, and/or associated with, one or more root topics of OBTAIN SOURCE TOPIC DATA REPRESENTING INFORMATION RELATED TO, AND/OR ASSOCIATED WITH, ONE OR MORE ROOT TOPICS OPERATION 203 is again searched for "keyword matched root topics" that not only match, or include, the keyword of THE USER SENDS A "FOLLOW-UP SMS TEXT MESSAGE" THAT INCLUDES A HIGHLIGHTED KEYWORD OPERATION 215 but also match, or are consistent with the context of, the initial search parameters of the "original SMS text message" from the user of A USER SENDS AN "ORIGINAL SMS TEXT MESSAGE" INCLUDING ONE OR MORE INITIAL SEARCH PARAMETERS OPERATION 205, and/or the "matched root topics" of IDENTIFY ONE OR MORE "MATCHED ROOT TOPICS" THAT MATCH, OR MOST CLOSELY MATCH, THE INITIAL SEARCH PARAMETERS OPERATION 209 at INTERPRET THE HIGHLIGHTED KEYWORD WITHIN THE CONTEXT OF THE INITIAL SEARCH PARAMETERS AND THE "MATCHED ROOT TOPICS" AND SEARCH THE SOURCE TOPIC DATA FOR "KEYWORD MATCHED ROOT TOPICS" MATCHING, OR MOST CLOSELY MATCHING, THE INITIAL SEARCH PARAMETERS AND THAT INCLUDE THE HIGHLIGHTED KEYWORD OPERATION 217, process flow proceeds to AUTOMATICALLY GENERATE AN "SMS KEYWORD SEARCH RESPONSE TEXT MESSAGE" THAT INCLUDES SMS TEXT REPRESENTING A DEFINED NUMBER OF THE "keyword matched root topics" and ONE OR MORE HIGHLIGHTED KEYWORDS ASSOCIATED WITH THE INITIAL SEARCH PARAMETERS AND/OR THE "KEYWORD MATCHED ROOT TOPICS" OPERATION 219.

In one embodiment, at AUTOMATICALLY GENERATE AN "SMS KEYWORD SEARCH RESPONSE TEXT MESSAGE" THAT INCLUDES SMS TEXT REPRESENTING A DEFINED NUMBER OF THE "keyword matched root topics" and ONE OR MORE HIGHLIGHTED KEYWORDS ASSOCIATED WITH THE INITIAL SEARCH PARAMETERS AND/OR THE "KEYWORD MATCHED ROOT TOPICS" OPERATION 219 an "SMS keyword search response text message" is automatically generated and sent to the user that includes SMS text representing a defined number of the "top" or most closely matched "keyword matched root topics" of INTERPRET THE HIGHLIGHTED KEYWORD WITHIN THE CONTEXT OF THE INITIAL SEARCH PARAMETERS AND THE "MATCHED ROOT TOPICS" AND SEARCH THE SOURCE TOPIC DATA FOR "KEYWORD MATCHED ROOT TOPICS" MATCHING, OR MOST CLOSELY MATCHING, THE INITIAL SEARCH PARAMETERS AND THAT INCLUDE THE HIGHLIGHTED KEYWORD OPERATION 217.

In one embodiment, at AUTOMATICALLY GENERATE AN "SMS KEYWORD SEARCH RESPONSE TEXT MESSAGE" THAT INCLUDES SMS TEXT REPRESENTING A DEFINED NUMBER OF THE "keyword matched root topics" and ONE OR MORE HIGHLIGHTED KEYWORDS ASSOCIATED WITH THE INITIAL SEARCH PARAMETERS AND/OR THE "KEYWORD MATCHED ROOT TOPICS" OPERATION 219, as a result of the search of the source topic data representing information related to, and/or associated with, one or more root topics using the keyword designated in the "follow-up SMS text message", one or more "keyword matched root topics" that include the designated keyword and match, or most closely match, the initial search parameter data are identified and a defined number of the "top" or most closely matched "keyword matched root topics" are selected.

In one embodiment, at AUTOMATICALLY GENERATE AN "SMS KEYWORD SEARCH RESPONSE TEXT MESSAGE" THAT INCLUDES SMS TEXT REPRESENTING A DEFINED NUMBER OF THE "keyword matched root topics" and ONE OR MORE HIGHLIGHTED KEYWORDS ASSOCIATED WITH THE INITIAL SEARCH PARAMETERS AND/OR THE "KEYWORD MATCHED ROOT TOPICS" OPERATION 219 the defined number of the most closely matched "keyword matched root topics" is chosen based on the limitations imposed by the SMS protocol. As an example, in one embodiment, at AUTOMATICALLY GENERATE AN "SMS KEYWORD SEARCH RESPONSE TEXT MESSAGE" THAT INCLUDES SMS TEXT REPRESENTING A DEFINED NUMBER OF THE "keyword matched root topics" and ONE OR MORE HIGHLIGHTED KEYWORDS ASSOCIATED WITH THE INITIAL SEARCH PARAMETERS AND/OR THE "KEYWORD MATCHED ROOT TOPICS" OPERATION 219, the two most closely matched "keyword matched root topics" are selected. In another example, in one embodiment, at AUTOMATICALLY GENERATE AN "SMS KEYWORD SEARCH RESPONSE TEXT MESSAGE" THAT INCLUDES SMS TEXT REPRESENTING A DEFINED NUMBER OF THE "keyword matched root topics" and ONE OR MORE HIGHLIGHTED KEYWORDS ASSOCIATED WITH THE INITIAL SEARCH PARAMETERS AND/OR THE "KEYWORD MATCHED ROOT TOPICS" OPERATION 219 the three most closely matched "keyword matched root topics" are selected.

In one embodiment, at AUTOMATICALLY GENERATE AN "SMS KEYWORD SEARCH RESPONSE TEXT MESSAGE" THAT INCLUDES SMS TEXT REPRESENTING A DEFINED NUMBER OF THE "keyword matched root topics" and ONE OR MORE HIGHLIGHTED KEYWORDS ASSOCIATED WITH THE INITIAL SEARCH PARAMETERS AND/OR THE "KEYWORD MATCHED ROOT TOPICS" OPERATION 219 the selected "keyword matched root topics" are again specially formatted with keywords highlighted and sent to the user in a "SMS keyword search response text message" via SMS. In one embodiment, the selected "keyword matched root topics" are specially formatted with keywords highlighted and automatically sent to user in a "SMS keyword search response text message" via SMS by one or more processors, such as processor 121 of FIG. 1, associated with an information source computing system, such as information source computing system 120 of FIG. 1.

Continuing with the one specific illustrative example discussed above, recall that the user's "follow-up SMS text message" included the follow-up phrase "more IIT" indicating the user desired more information associated with the "IIT", the Indian Technical Institute. Consequently, in this specific illustrative example, the "SMS keyword search response text message" would include the following text indicating the "keyword matched root topics" of:

a. "[IIT] [campuses], [degrees], [courses]"

As seen above, the words "IIT", "campuses", "degrees", "courses" are keywords and are therefore bracketed as [IIT], [campuses], [degrees], [courses] indicating not only that more information is available for the keywords "campuses", "degrees", "courses", but also that even more information than is listed in this "SMS keyword search response text message" regarding the "IIT" is available.

Returning to FIG. 2, in various embodiments, the exchange of "follow-up SMS text messages" including designated keywords, or keyword response phrases, of THE USER SENDS A "FOLLOW-UP SMS TEXT MESSAGE" THAT INCLUDES A HIGHLIGHTED KEYWORD OPERATION 215 and "SMS keyword search response text messages" including "keyword matched root topics" and additional highlighted keywords of AUTOMATICALLY GENERATE AN "SMS KEYWORD SEARCH RESPONSE TEXT MESSAGE" THAT INCLUDES SMS TEXT REPRESENTING A DEFINED NUMBER OF THE "keyword matched root topics" and ONE OR MORE HIGHLIGHTED KEYWORDS ASSOCIATED WITH THE INITIAL SEARCH PARAMETERS AND/OR THE "KEYWORD MATCHED ROOT TOPICS" OPERATION 219 can be repeated as many times as the user desires until the desired level of information specificity is attained. Consequently, in the "follow-up SMS text message", or subsequent "follow-up SMS text messages", the user can use the highlighted keywords to define, and automatically request, further refined searches and, in one embodiment, these further refined searches are performed while interpreting the added search parameters, in the form of the identified keywords, within the context of all the initial parameters, and all keywords, identified thus far.

For instance, continuing with the one specific illustrative example discussed above, the user may send back a second "follow-up SMS text message" including the follow-up phrase "more campuses". In this case, a second "SMS keyword search response text message" would include the following text indicating the second "keyword matched root topics" of:

a. "[IIT], [Bombay], [Delhi], [Madras], [Kharagpur]"

As seen above, the words "IIT", "Bombay", "Delhi", "Madras", and "Kharagpur" are keywords and are therefore bracketed as [Bombay], [Delhi], [Madras], [Kharagpur] indicating not only that more information is available for the keywords "Bombay", "Delhi", "Madras", and "Kharagpur", such as classes, class schedules, faculty, or contact information or addresses, but also that even more information than is listed in this second "SMS keyword search response text message" regarding the "IIT" is available.

In one embodiment, once an "SMS keyword search response text message" is automatically generated and sent to the user that includes SMS text representing a defined number of the "top" or most closely matched "keyword matched root topics at AUTOMATICALLY GENERATE AN "SMS KEYWORD SEARCH RESPONSE TEXT MESSAGE" THAT INCLUDES SMS TEXT REPRESENTING A DEFINED NUMBER OF THE "keyword matched root topics" and ONE OR MORE HIGHLIGHTED KEYWORDS ASSOCIATED WITH THE INITIAL SEARCH PARAMETERS AND/OR THE "KEYWORD MATCHED ROOT TOPICS" OPERATION 219, process flow proceeds to MORE KEYWORD REFINEMENTS DESIRED? OPERATION 221.

In one embodiment, at MORE KEYWORD REFINEMENTS DESIRED? OPERATION 221 the exchange of "follow-up SMS text messages" including designated keywords, or keyword response phrases, of THE USER SENDS A "FOLLOW-UP SMS TEXT MESSAGE" THAT INCLUDES A HIGHLIGHTED KEYWORD OPERATION 215 and "SMS keyword search response text messages" including "keyword matched root topics" and additional highlighted keywords of AUTOMATICALLY GENERATE AN "SMS KEYWORD SEARCH RESPONSE TEXT MESSAGE" THAT INCLUDES SMS TEXT REPRESENTING A DEFINED NUMBER OF THE "keyword matched root topics" and ONE OR MORE HIGHLIGHTED KEYWORDS ASSOCIATED WITH THE INITIAL SEARCH PARAMETERS AND/OR THE "KEYWORD MATCHED ROOT TOPICS" OPERATION 219 can be repeated as many times as the user desires until the desired level of information specificity is attained by taking path 223Y, indicating "yes" the user desires to send another "follow-up SMS text message" including designated keywords, or keyword response phrases, and process proceeds back to THE USER SENDS A "FOLLOW-UP SMS TEXT MESSAGE" THAT INCLUDES A HIGHLIGHTED KEYWORD OPERATION 215.

In one embodiment, should the user desire to begin a new search, i.e., to reset the entire search and interaction process, the user need only resend the original SMS text message with initial search parameters.

As noted above, by repeatedly taking path 223Y, indicating "yes" the user desires to send another "follow-up SMS text message" including designated keywords, or keyword response phrases, and repeated returning the process back to THE USER SENDS A "FOLLOW-UP SMS TEXT MESSAGE" THAT INCLUDES A HIGHLIGHTED KEYWORD OPERATION 215, a thread, or tree, of related root topic and root topic related information searches associated with a thread of SMS text messages is created to provide the user with a fully interactive information search and distribution system using a SMS communication channel, and within the constraints of the SMS protocols.

In various embodiments, once the user has obtained the desired information, and/or has attained the desired level of information specificity, path 233N is taken, indicating "no" the user does not desire to send another "follow-up SMS text message" including designated keywords, or keyword response phrases.

In one embodiment, once the user has obtained the desired information, and/or has attained the desired level of information specificity, and path 233N is taken, indicating "no" the user does not desire to send another "follow-up SMS text message" including designated keywords, or keyword response phrases, process flow proceeds to EXIT OPERATION 230.

In one embodiment, at EXIT OPERATION 230 process for providing a SMS-based interactive information search and distribution system 200 is exited to await new data.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

Using process for providing a SMS-based interactive information search and distribution system 200, keywords are flexibly and dynamically defined, inferred, selected, and interpreted, by the content, and within the context, of the set of SMS text messages sent and the root topic and root topic related information itself. Consequently, the SMS-based interactive information search and distribution systems provided using process for providing a SMS-based interactive information search and distribution system 200 are user friendly and their use/operation is intuitive for the user.

In addition, as discussed above, using process for providing a SMS-based interactive information search and distribution system 200, a thread of root topic and root topic related information searches associated with a thread of SMS text messages is created to provide the user with a fully interactive information search and distribution system using a SMS communication channel, and within the constraints of the SMS protocols. Consequently, the severe limitations of SMS communication channels that had historically prevented SMS channels from being used as an interactive information search and distribution means are overcome. Therefore, using process for providing a SMS-based interactive information search and distribution system 200, many users/consumer in areas of the world having emerging economies can be provided more of the benefits of the information age and the benefits of interactive root topic and root topic related information searches and distribution.

As discussed in more detail above, using the above embodiments, with little or no modification and/or healthcare consumer input, there is considerable flexibility, adaptability, and opportunity for customization to meet the specific needs of various healthcare consumers under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "searching", "identifying", "interpreting", "detecting", "inserting", "posting", "sending", "obtaining", "establishing", "posting", "intercepting", "accessing", "scanning", "transforming", "linking", "verifying", "monitoring", "browsing", "updating", "associating", "analyzing", "defining", "storing", "saving", "displaying", "implementing", "performing", "creating", "assigning", "estimating", "entering", "modifying", "categorizing", "providing", "processing", "accessing", "selecting", "scheduling", "creating", "using", "comparing", "submitting", "generating", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter.

Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computer-implemented method for providing a short message system (SMS) based interactive information search and distribution system comprising the following which are executed by one or more processors:

providing a short message system (SMS) based interactive information search and distribution system;

obtaining source topic data representing information related to one or more root topics, wherein the source topic data representing information related to one or more root topics is in the form of Extensible Markup Language (XML);

receiving an original SMS text message via an SMS communication link, the original SMS text message including at least one initial search parameter;

searching, in a first search, the source topic data for one or more matched root topics that most closely match the at least one initial search parameter;

identifying one or more matched root topics that most closely match the at least one initial search parameter in the source topic data;

selecting a defined number of the identified matched root topics to be sent in response to the original SMS text message;

analyzing the selected matched root topics and the source topic data to identify one or more keywords in the selected matched root topics, the keywords being associated with keyword information;

identifying one or more keywords in the selected matched root topics;

generating an SMS search response message that includes SMS text representing the analyzed matched root topics and at least one keyword of the one or more identified keywords with the at least one keyword being highlighted by one or more highlighting methods to distinguish the at least one keyword from the other SMS text;

sending the SMS search response message via an SMS communications link;

receiving a follow-up SMS text message via an SMS communications link, the follow-up SMS text message including a selected keyword from the SMS search response message;

interpreting the selected keyword in context of the matched root topics and the initial search parameters and then using the selected keyword and the initial search parameters to perform a second search of the source topic data for one or more keyword matched root topics that most closely match the at least one initial search parameter and include the selected keyword;

identifying one or more keyword matched root topics that most closely match the at least one initial search parameter in the source topic data and include the selected keyword;

selecting a defined number of the identified keyword matched root topics to be sent in response to the follow-up SMS text message;

analyzing the selected keyword matched root topics and the source topic data to identify a second set of one or more keywords in the selected keyword matched root topics, the second set of one or more keywords being associated with a second keyword;

generating an SMS keyword search response message that includes SMS text representing the keyword matched root topics and at least one keyword of the identified second set of keywords, with any keywords of the second set of keywords being highlighted by one or more highlighting methods to distinguish keywords of the second set of keywords from other SMS text; and sending the SMS keyword search response message via an SMS communications link.

2. The computer-implemented method for providing a short message system (SMS) based interactive information search and distribution system of claim 1, wherein;

at least part of the source topic data representing information related to one or more root topics is obtained from a network.

3. The computer-implemented method for providing a short message system (SMS) based interactive information search and distribution system of claim 1, wherein;

at least part of the source topic data is analyzed to identify one or more key features associated with the source topic data and the one or more key features are used to correlate and categorize the information represented by the source topic data.

4. The computer-implemented method for providing a short message system (SMS) based interactive information search and distribution system of claim 3, wherein;

at least one of the key features associated with the source topic data is selected from at least one of the group of key features consisting of:

one or more root topics;

the general or specific sub-topics associated with the one or more root topics;

names associated with the one or more root topics; other root topics related to, or associated with, the one or more root topics;

information and details related to one or more root topics; and one or more locations associated with the one or more root topics.

5. The computer-implemented method for providing a short message system (SMS) based interactive information search and distribution system of claim 3, wherein;

at least one of the one or more keywords are selected from the key features associated with the source topic data.

6. The computer-implemented method for providing a short message system (SMS) based interactive information search and distribution system of claim 1, wherein;

the at least one initial search parameter includes the name of the root topic of interest and the location of an originator of the original SMS text message.

7. The computer-implemented method for providing a short message system (SMS) based interactive information search and distribution system of claim 1, wherein;

the defined number of the identified matched root topics is selected based, on the limits imposed by SMS communication channels and SMS communication protocols.

8. The computer-implemented method for providing a short message system (SMS) based interactive information search and distribution system of claim 1, wherein;

the one or more keywords are selected or inferred by the content, or context, of the original SMS text message and the initial search parameters.

9. The computer-implemented method for providing a short message system (SMS) based interactive information search and distribution system of claim 1, wherein;
the keywords are highlighted by enclosing the keywords in brackets "[ ]".

10. The computer-implemented method for providing a short message system (SMS) based interactive information search and distribution system of claim 1, wherein;
the second set of one or more keywords are selected or inferred by the content, or context, of the original SMS text message, the initial search parameters, or the matched root topics, or the keyword matched root topics.

11. A system for providing a short message system (SMS) based interactive information search and distribution system comprising:
one or more processors and one or more memories, at least one of the one or more processors executing instructions stored within the one or more memories, the instructions being of an SMS based interactive information search and distribution process, the SMS based interactive information search and distribution process including:
obtaining source topic data representing information related to one or more root topics wherein the source topic data representing information related to one or more root topics is in the form of Extensible Markup Language (XML);
receiving an original SMS text message via an SMS communication link, the original SMS text message including at least one initial search parameter;
searching, in a first search, the source topic data for one or more matched root topics that most closely match the at least one initial search parameter;
identifying one or more matched root topics that most closely match the at least one initial search parameter in the source topic data;
selecting a defined number of the identified matched root topics to be sent in response to the original SMS text message;
analyzing the selected matched root topics and the source topic data to identify one or more keywords in the selected matched root topics, the keywords being associated with keyword information;
identifying one or more keywords in the selected matched root topics;
generating an SMS search response message that includes SMS text representing the analyzed matched root topics and at least one keyword of the one or more identified keywords with the at least one keyword being highlighted by one or more highlighting methods to distinguish the at least one keyword from the other SMS text;
sending the SMS search response message via an SMS communications link;
receiving a follow-up SMS text message via an SMS communications link, the follow-up SMS text message including a selected keyword from the SMS search response message;
interpreting the selected keyword in context of the matched root topics and the initial search parameters and then using the selected keyword and the initial search parameters to perform a second search of the source topic data for one or more keyword matched root topics that most closely match the at least one initial search parameter and include the selected keyword;
identifying one or more keyword matched root topics that most closely match the at least one initial search parameter in the source topic data and include the selected keyword;
selecting a defined number of the identified keyword matched root topics to be sent in response to the follow-up SMS text message;
analyzing the selected keyword matched root topics and the source topic data to identify a second set of one or more keywords in the selected keyword matched root topics, the second set of one or more keywords being associated with second keyword information;
generating an SMS keyword search response message that includes SMS text representing the keyword matched root topics and at least one keyword of the identified second set of keywords, with any keywords of the second set of keywords being highlighted by one or more highlighting methods to distinguish keywords of the second set of keywords from other SMS text; and
sending the SMS keyword search response message via an SMS communications link.

12. The system for providing a short message system (SMS) based interactive information search and distribution system of claim 11, wherein;
at least part of the source topic data representing information related to one or more root topics is obtained from a network.

13. The system for providing a short message system (SMS) based interactive information search and distribution system of claim 11, wherein;
at least part of the source topic data is analyzed to identify one or more key features associated with the source topic data and the one or more key features are used to correlate and categorize the information represented by the source topic data.

14. The system for providing a short message system (SMS) based interactive information search and distribution system of claim 13, wherein;
at least one of the key features associated with the source topic data is selected from at least one of the group of key features consisting of:
one or more root topics;
the general or specific sub-topics associated with the one or more root topics;
names associated with the one or more root topics; other root topics related to, or associated with, the one or more root topics;
information and details related to one or more root topics; and
one or more locations associated with the one or more root topics.

15. The system for providing a short message system (SMS) based interactive information search and distribution system of claim 13, wherein;
at least one of the one or more keywords are selected from the key features associated with the source topic data.

16. The system for providing a short message system (SMS) based interactive information search and distribution system of claim 11, wherein;
the at least one initial search parameter includes the name of the root topic of interest and the location of an originator of the original SMS text message.

17. The system for providing a short message system (SMS) based interactive information search and distribution system of claim 11, wherein;

the defined number of the identified matched root topics is selected based on the limits imposed by SMS communication channels and SMS communication protocols.

18. The system for providing a short message system (SMS) based interactive information search and distribution system of claim 11, wherein;

the one or more keywords are selected or inferred by the content, or context, of the original SMS text message and the initial search parameters.

19. The system for providing a short message system (SMS) based interactive information search and distribution system of claim 11, wherein;

the keywords are highlighted by enclosing the keywords in brackets "[ ]".

20. The system for providing a short message system (SMS) based interactive information search and distribution system of claim 11, wherein;

the second set of one or more keywords are selected or inferred by the content, or context, of the original SMS text message, the initial search parameters, or the matched root topics, or the keyword matched root topics.

* * * * *

UNITED STATES PATENT AND TRADEMARK OFFICE
CERTIFICATE OF CORRECTION

| | | |
|---|---|---|
| PATENT NO. | : 8,849,854 B2 | Page 1 of 1 |
| APPLICATION NO. | : 13/014862 | |
| DATED | : September 30, 2014 | |
| INVENTOR(S) | : Kashinath Kakarla et al. | |

It is certified that error appears in the above-identified patent and that said Letters Patent is hereby corrected as shown below:

In the Claims

In Column 32, Line 48, Claim 14, replace "toone" with --to one--.

Signed and Sealed this
Twenty-fourth Day of February, 2015

Michelle K. Lee
*Deputy Director of the United States Patent and Trademark Office*